United States Patent [19]

Gay, Jr. et al.

[11] Patent Number: 4,526,509
[45] Date of Patent: Jul. 2, 1985

[54] RUB TOLERANT SHROUD

[75] Inventors: Charles H. Gay, Jr., Loveland; Dean T. Lenahan, Cincinnati, both of Ohio

[73] Assignee: General Electric Company, Cincinnati, Ohio

[21] Appl. No.: 526,857

[22] Filed: Aug. 26, 1983

[51] Int. Cl.³ .................... F01D 11/08; F16J 15/32
[52] U.S. Cl. .................... 415/174; 415/196; 277/53
[58] Field of Search ............. 415/174, 172 A, 173 R, 415/135; 277/53, 55, 213

[56] References Cited

U.S. PATENT DOCUMENTS

| | | | |
|---|---|---|---|
| 3,694,882 | 10/1972 | Desmond | 415/174 |
| 3,834,001 | 9/1974 | Carroll et al. | 29/414 |
| 3,843,278 | 10/1974 | Torell | 415/174 |
| 3,867,061 | 2/1975 | Moskowitz | 415/174 |
| 3,887,299 | 6/1975 | Profant | 415/174 |
| 3,916,054 | 10/1975 | Long et al. | 428/117 |
| 3,970,319 | 7/1976 | Carroll et al. | 277/53 |
| 4,022,481 | 5/1977 | Long et al. | 277/96.1 |
| 4,063,742 | 12/1977 | Watkins, Jr. | 277/53 |
| 4,198,839 | 4/1980 | Linko et al. | 72/199 |
| 4,398,508 | 8/1983 | Moon et al. | 415/174 |

Primary Examiner—Robert E. Garrett
Assistant Examiner—H. Edward Li
Attorney, Agent, or Firm—Douglas S. Foote; Derek P. Lawrence

[57] ABSTRACT

A seal structure between first and second relatively moveable members for preventing gas flow in the space between the members and transverse to their general direction of motion is disclosed. The seal structure includes a plurality of substantially parallel strips within 30° of normal to the radial plane generally containing these first and second relatively moveable members. The strips are thin and closely spaced and arranged so that one strip edge is attached to the first member and another edge is free to resiliently deflect when in rubbing contact with the second member.

10 Claims, 6 Drawing Figures

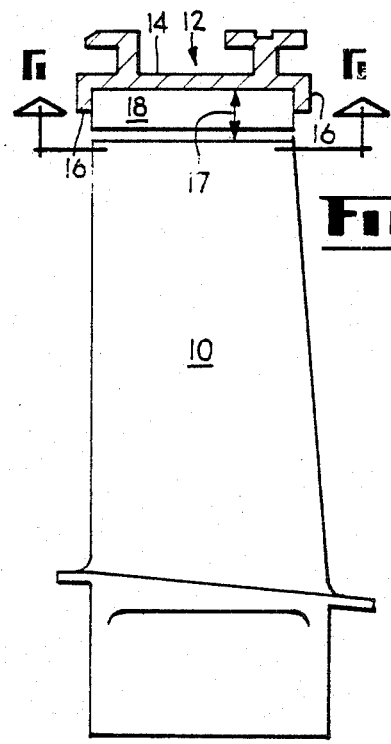
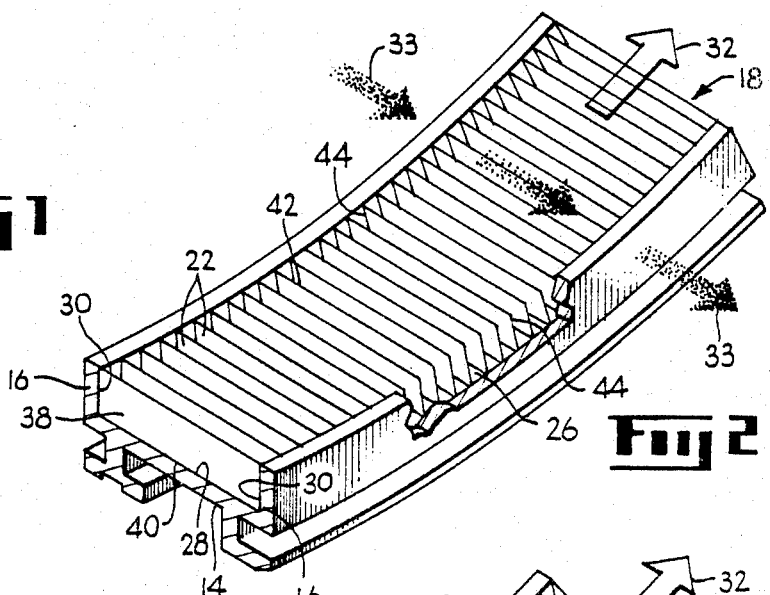
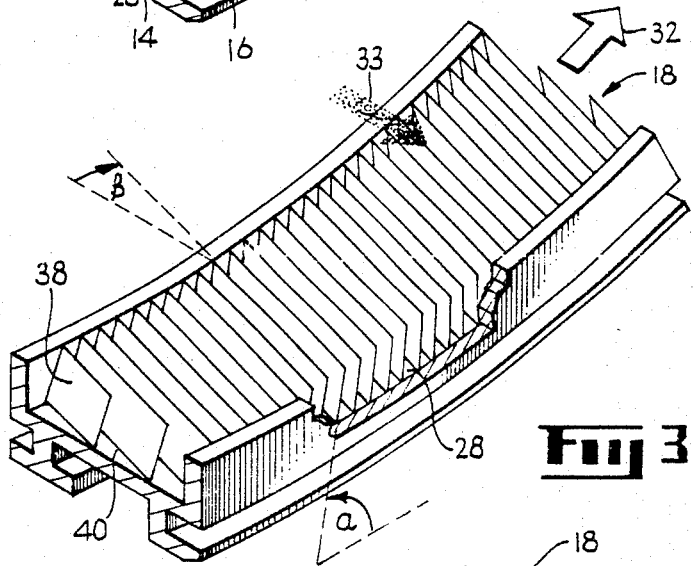
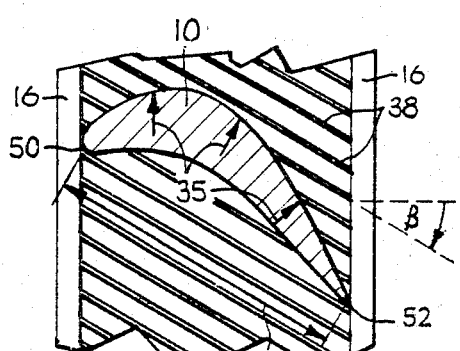
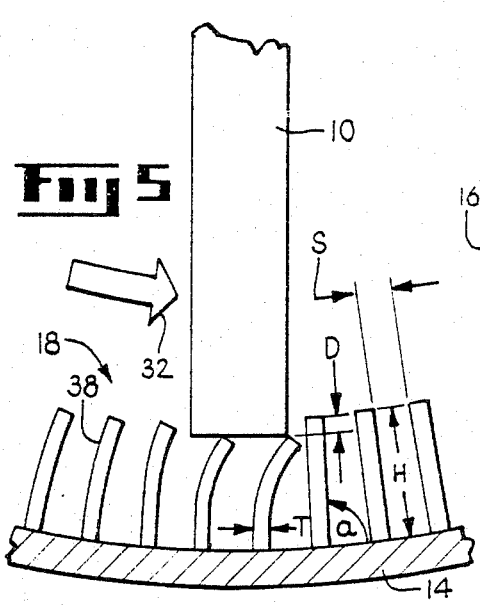
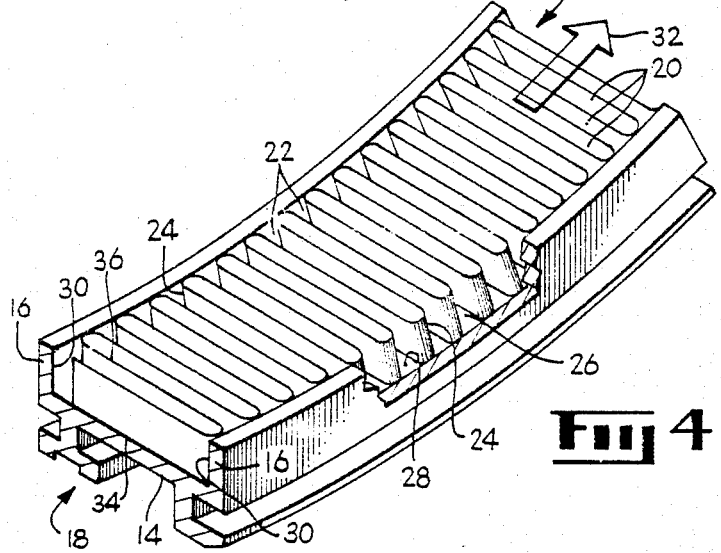

RUB TOLERANT SHROUD

The invention described herein was made in the performance of work under NASA Contract No. NAS3-20643 and is subject to the provisions of Section 305 of the National Aeronautics and Space Act of 1958 (72 Stat. 435; 42 U.S.C. 2457).

This invention relates generally to a sealing structure for a bladed rotor, and more particularly, to deflectable sealing structures which maintain blade integrity and minimum leakage during rotor blade growth.

BACKGROUND OF THE INVENTION

The efficiency of gas turbine engines depends in part on maintaining dimensional tolerances during all phases of engine operation. A particularly difficult dimensional tolerance to maintain is that between the free tips of turbine rotor blades and the surrounding shroud. Typically, the rotor blades reach an elevated temperature during operation resulting in their radial growth. During periods of maximum growth the blade tips may wear down as they rub on the shroud thereby increasing the gap between blade tips and shroud during other periods of engine operation. One means for preventing the blades from contacting the shroud is to allow a sufficient gap between blade tips and shroud for maximum blade growth. If such a gap is provided, significant quantities of gas may leak therethrough during periods of non-maximum growth, thereby reducing the turbine efficiency.

An alternative solution for maintaining a good seal during blade growth is to employ an abradable shroud material. Such material is intended to wear down as rotating blade tips make contact therewith. Efforts to develop useful shrouds by this approach have experienced problems. For example, shrouds may be too soft and easily erodable or they may be susceptible to oxidation thereby being degraded. When shrouds are hardened to adequately resist the severe turbine environment or from engine operation, excessive blade wear occurs. In either case the resultant increase in blade tip clearance contributes significantly to turbine performance deterioration.

A further solution to maintaining improved seal clearance has been made possible by the availability of oxidation resistant metallic materials in foil form. One type of seal using such materials is disclosed in U.S. Pat. No. 3,916,054 issued Oct. 28, 1975 to Long et al. for COMPLIANT STRUCTURAL MEMBERS. The Long seal consists of corrugated metallic strips disposed in side by side relationship in the circumferential direction of blade rotation. This seal is typical of prior art seals in that the general orientation of the sealing strips is parallel to the direction of blade rotation. In addition, it is believed that the Long seal is abradable and permanently deforms to the rotating blade tips.

OBJECTS OF THE INVENTION

It is an object of the present invention to provide a new and improved seal structure.

Another object of the present invention is to provide a new and improved seal structure in which the seal elements are aligned normal to the general direction of leakage gas flow.

It is a further object of the present invention to provide a seal structure which is resilient rather than abradable.

It is yet another object of the present invention to provide a new and improved seal structure which reduces gas flow leakage in the space between two relatively moveable members.

It is still a further object of the present invention to provide a new and improved rub tolerant shroud which reduces blade tip wear.

These and other objects of the invention, together with the features and advantages thereof, will become apparent from the following detailed specification when read in conjunction with the accompanying drawings in which applicable reference numerals have been carried forward.

SUMMARY OF THE INVENTION

In one form of the present invention a seal structure for reducing gas flow in the space between first and second relatively moveable members is disclosed. The seal structure includes a plurality of deflectable strips each being substantially parallel to adjacent strips and disposed within 30° of normal to the radial plane generally containing these first and second relatively moveable members. Each strip includes two edges, one edge being attached to the first member and the other edge being resiliently deflectable when in rubbing contact with the second member.

In one specific form of the present invention a rub tolerant shroud surrounding a rotating blade member is disclosed. The shroud includes a backing member and a plurality of strips. Each strip is within 30° of normal to the radial plane generally containing the rotating blade member. In addition, each strip has first and second edges with the first edge being joined to the backing member and the second edge being resiliently deflectable when in rubbing contact with the blade member.

BRIEF DESCRIPTION OF THE DRAWINGS

FIG. 1 shows a partial cross-sectional side view of a shroud and blade member of a turbomachine.

FIG. 2 shows a perspective view of a portion of the shroud of FIG. 1.

FIG. 3 shows a perspective view of a portion of the shroud of FIG. 1 according to an alternative embodiment of the invention.

FIG. 4 shows a perspective view of a portion of the shroud of FIG. 1 according to another form of the present invention.

FIG. 5 shows a diagrammatic axial cross-sectional view of the rotor and shroud of FIG. 1.

FIG. 6 shows a view of the shroud embodied in FIG. 3, taken along the line 6—6 on FIG. 1.

DETAILED DESCRIPTION OF THE INVENTION

FIG. 1 shows a turbine blade member 10 and outer shroud 12. Shroud 12 includes a curved backing member 14 with radially inner protruding flanges 16. Attached to backing member 14 is seal structure 18 which is shown in more detail in FIG. 2. Seal structure 18 substantially fills the space 17 between backing member 14 and blade member 10.

FIG. 2 is a perspective view of a portion of shroud 12. A channel 26 is contained within backing member 14 and bounded by radially inner surface 28 and facing surfaces 30 of flanges 16. Seal structure 18 is formed by a plurality of strips 38, each strip being substantially parallel to adjacent strips. More precisely, each strip 38 is contained within a plane through the axis of rotation of blade member 10, referred to hereinafter as an axial plane. For this reason, adjacent strips 38 are substantially, although not exactly, parallel. Each strip 38 has a radially outer first edge 40 and a radially inner second edge 42. First edge 40 is attached to surface 28 of backing member 14 by brazing, diffusion bonding or other suitable bonding method. Second edge 42 is located proximate to blade member 10 and is in rubbing contact therewith during certain periods of operation. Separating each strip 38 is a narrow slot 22. Strips 38 extend between facing surfaces 30 of flanges 16 but are not fastened to surfaces 30 in a manner which precludes deflection of edge 42.

FIG. 3 shows a perspective view of a portion of shroud 12 in an alternative embodiment of the invention. Seal structure 18 includes a plurality of strips 38 substantially parallel to adjacent strips, as in the embodiment of FIG. 2. However, each strip may be angled in one or both of two directions. Firstly, each strip 38 may form an angle alpha with respect to a tangent plane to surface 28 through the midpoint of first edge 40 of such strip 38. Angle alpha can vary from about 90°, as in the embodiment of FIG. 2, to about 45° with a preferred value of about 60°. As shown, strips 38 are angled generally in the direction of rotation 32 of blade member 10. By so angling strips 38, they will deflect with less force thereby causing less blade wear. Secondly, strip 38 may be angled at an angle beta with respect to a normal to the radial plane generally containing the rotating blade member 10, i.e., beta is the angle with respect to the axial direction shown by arrows 33. The purpose of angling strips 38 with respect to a normal to the radial plane, i.e. angle beta, is to more closely align them with the chord of blade member 10 as it sweeps in rubbing contact across strips 38.

FIG. 6 shows a view of shroud 12 in the embodiment shown in FIG. 3, as viewed from the line 6—6 in FIG. 1. Blade member 10 is shown with leading edge 50 and trailing edge 52. The chord 54 of blade member 10 is the line segment joining leading edge 50 and trailing edge 52. Leakage flow, shown generally by arrows 35, is generally normal to these angled strips, so that the strips reduce gas flow in the space 17, shown in FIG. 1, between blade member 10 and backing member 14.

Although in a preferred embodiment strips 38 generally align with chord 54, angle beta can be established at any angle that generally conforms to blade member geometry, with preferred values from about 0°, as shown in FIG. 2, to about 30°. It should be clear from the above description that the invention is not limited to the specific embodiments shown in FIGS. 2, 3 and 6. For example, strips 38 may be normal to the direction of blade rotation 32 but inclined in that direction, i.e., angle beta equals 0° and angle alpha is less than 90°.

FIG. 4 is a perspective view of a portion of shroud 12 according to a further embodiment of the invention. Seal structure 18 is formed by making a series of alternate 180° folds at equal distances along an elongated, flat foil piece so as to form a plurality of pleats 20 substantially parallel to adjacent pleats. Each pleat 20 is spaced from the adjacent pleat by a narrow slot 22. Thus formed, structure 18 includes fold portions 24 with each slot 22 having a single fold portion 24 at one end and adjacent slots 22 having fold portions 24 at opposing ends. In addition, each pleat 20 has two edges: a radially outer first edge 34 and a radially inner second edge 36. Seal structure 18 is disposed in channel 26 of backing member 14 so that the orientation of pleats 20 is substantially normal to the radial plane containing rotating blade member 10. Seal structure 18 is attached to backing member 14 by brazing, diffusion bonding or otherwise suitably attaching first edge 34 to surface 28. In the embodiment shown in FIG. 4, each pleat 20 is normal to a tangent plane through its first edge 34. Thus, each pleat 22 is confined to an axial plane and is substantially parallel to adjacent pleats. It is within the scope of the present invention to angle pleats 20 in either or both of angles alpha and beta as described and illustrated with respect to FIG. 3.

The cold clearance or gap between a turbine blade and surrounding shroud at engine start-up may be approximately 60 mils. This gap decreases as the heated blade grows radially during engine operation. As shown in cross-sectional axial view in FIG. 5, blade member 10 penetrates seal structure 18 during certain transient stages of engine operation and deflects strips 38 as it rotates about its axis. As each strip 38 is contacted by blade member 10, it deflects without damage to blade member 10 or significant degradation of its own structure. As blade member 10 passes successive strips 38, each strip resiliently rebounds. Although the rebound does not return strip 38 to its initial planar shape, the spring-back is sufficient to ensure that on subsequent passes of blade member 10 rubbing contact will continue. Such cyclical deflection and spring-back provides a seal for reducing gas flow in the space between blade member 10 and shroud 12 without significant blade wear.

A number of factors must be considered in the design of shrouds in accordance with the present invention. As shown in FIGS. 3 and 5 these include: the height H and the thickness T of strip 38, the width S of slot 22, the depth of incursion or rub in depth D of blade member 10 into seal structure 18, the angle of inclination alpha of strip 38 and the angle beta to the normal to the radial plane The following Table specifies for selected parameters the preferred range and a specific embodiment.

TABLE

| Parameter | Preferred Range | Specific Embodiment |
|---|---|---|
| alpha | 45°–90° | 60° |
| beta | 0°–30° | aligned with blade chord |
| T | 1–10 mil | 3 mil |
| S | 1–5 mil | 1 mil |
| H | 50–450 mil | 150 mil |

In addition, the quality of the strip material as measured by its modulus of elasticity, percent of elongation and heat and oxidation resistance must be considered. In general, any heat and oxidation resistant alloy with good ductility may be advantageously employed. For example, commercially available materials such as Kanthal, Hastalloy X, Hastalloy HS 188, Inconel 625 and Inconel X750 alloys each exhibit these properties and may be used in the present invention.

The rub in depth D cannot be as accurately controlled as the aforementioned parameters. As stated above, the separation or gap between a turbine blade and its surrounding shroud at engine start up may be approximately 60 mils. During steady state operation this may decrease to about 15 mils. However, during certain transient stages blade member 10 penetrates seal structure 18. The rub in depth D varies but may reach 10 to 30 mils. The parameter values given in the Table are based on the assumption of this range for rub in depth. Accordingly, they may be varied from the values therein stated as required.

It will be clear to those skilled in the art that the present invention is not limited to the specific embodiments described and illustrated herein. Nor is the invention limited to shrouds surrounding rotating blade members but it applies equally to seal structures sealing two relatively moveable members against fluid flow transverse to their relative direction of rotation.

It will be understood that the dimensions and proportional structural relationships shown in the drawings are illustrated by way of example only and these illustrations are not to be taken as the actual dimensions or proportional structural relationships used in the shroud of the present invention.

Numerous modifications, variations, and full and partial equivalents can be undertaken without departing from the invention as limited only by the spirit and scope of the appended claims.

What is claimed and desired to be secured by Letters Patent of the United States is the following:

1. In a turbine engine including a rotating blade member, a rub tolerant shroud surrounding said blade member comprising:
    a backing member; and
    a plurality of generally planar strips having first and second edges, wherein each of said strips is substantially parallel to adjacent strips, and is within 30° of normal to the radial plane generally containing said rotating blade member;
    wherein said first edge is joined to said backing member and said second edge is resiliently deflectable when in rubbing contact with said blade member.

2. A shroud, as recited in claim 1, wherein each of said strips is confined to a plane through the axis of rotation of said blade member.

3. A shroud, as recited in claim 1, wherein each of said strips is substantially normal to the radial plane generally containing said rotating member and is angled generally in the direction of rotation of said blade.

4. A shroud, as recited in claim 1, wherein the thickness of each of said strips is between 1 and 10 mils and said strips are spaced by a slot of width from 1 to 5 mils.

5. A shroud, as recited in claim 4, wherein said strip is selected from the group of materials consisting of Kanthal, Hastalloy X, Hastalloy HS 188, Inconel 625 and Inconel X750.

6. In a turbine engine including a rotating blade member, a rub tolerant shroud surrounding said blade member comprising:
    a backing member; and
    a resiliently deflectable elongated foil piece with first and second edges, folded to form a plurality of pleats, each of said pleats being substantially contained within an axial plane and joined at said first edge to said backing member;
    wherein said pleats resiliently deflect when said rotating blade member contacts said second edge of said pleats.

7. A seal structure for reducing gas flow in the space between first and second relatively rotatable members, such rotation being confined to a plane which generally contains said members, comprising:
    a plurality of generally planar deflectable strips, each strip being substantially parallel to adjacent strips and being disposed within 30° of normal to said plane;
    wherein said first edge is connected to said first member and said second edge is resiliently deflectable when in rubbing contact with said second member.

8. A seal structure for reducing gas flow in the space between first and second relatively rotatable members, such rotation being confined to a plane which generally contains said members, comprising:
    a deflectable elongated foil piece folded to form a plurality of pleats, each of said pleats being substantially parallel to an adjacent pleat said pleats being within 30° of normal to said plane;
    wherein said first edge is connected to said first member and said second edge is resiliently deflectable when in rubbing contact with said second member.

9. In a turbine engine including a rotating blade member with leading edge and trailing edge, a rub tolerant shroud surrounding said blade member comprising:
    a backing member; and
    a plurality of generally planar strips having first and second edges, wherein each of said strips is substantially parallel to adjacent strips, and is generally aligned with the blade member chord joining said leading edge and said trailing edge;
    wherein said first edge is joined to said backing member and said second edge is resiliently deflectable when in rubbing contact with said blade member.

10. A shroud, as recited in claim 9, wherein each of said strips is angled generally in the direction of rotation of said blade member.

* * * * *